(12) United States Patent
Aihara

(10) Patent No.: US 7,245,049 B2
(45) Date of Patent: Jul. 17, 2007

(54) VIBRATOR AND METHOD FOR MANUFACTURING THE SAME

(75) Inventor: Kenshi Aihara, Yamanashi (JP)

(73) Assignee: Citizen Electronics Co., Ltd., Yamanashi (JP)

( * ) Notice: Subject to any disclaimer, the term of this patent is extended or adjusted under 35 U.S.C. 154(b) by 92 days.

(21) Appl. No.: 10/787,081

(22) Filed: Feb. 27, 2004

(65) Prior Publication Data
US 2004/0169425 A1    Sep. 2, 2004

(30) Foreign Application Priority Data
Feb. 28, 2003   (JP) .......................... P2003-053355

(51) Int. Cl.
H02K 33/00 (2006.01)
H02K 35/00 (2006.01)
H02K 7/06 (2006.01)
H02K 7/10 (2006.01)

(52) U.S. Cl. ............................. 310/15; 310/81; 310/17; 381/400

(58) Field of Classification Search ................ 310/15, 310/17, 28, 21, 22; 379/431; 360/244.2; 340/7.6
See application file for complete search history.

(56) References Cited

U.S. PATENT DOCUMENTS

| | | | | |
|---|---|---|---|---|
| 2,128,555 A | * | 8/1938 | Benway | 601/95 |
| 2,280,610 A | * | 4/1942 | Van Fleet | 15/98 |
| 2,561,355 A | * | 7/1951 | Fish | 340/401.1 |
| 3,075,101 A | * | 1/1963 | Neff | 310/29 |
| 3,360,704 A | * | 12/1967 | Kohlhagen | 318/128 |
| 3,830,099 A | * | 8/1974 | Ichikawa | 73/668 |
| 4,120,617 A | * | 10/1978 | Brinkman | 417/410.1 |
| 4,318,016 A | * | 3/1982 | McMullan et al. | 310/19 |
| 5,062,140 A | * | 10/1991 | Inanaga et al. | 381/399 |
| 5,184,037 A | * | 2/1993 | Kobayashi et al. | 310/26 |
| 5,246,353 A | * | 9/1993 | Sohn | 417/413.1 |

(Continued)

FOREIGN PATENT DOCUMENTS

JP        06-120866        4/1994

(Continued)

OTHER PUBLICATIONS

Tokyo Parts Ind Co. Ltd., "Flat Coreless Vibration Motor" Patent Abstracts of Japan JP-08-205565, Jul. 22, 1994. Retrieved from the Internet: <URL: www19.ipdl.jpo.go.jp/PA1/result/detail/main/wAABsaWuhDA406205565P2.h . . . >.

(Continued)

Primary Examiner—Burton S. Mulling
Assistant Examiner—Erik Preston
(74) Attorney, Agent, or Firm—Browdy and Neimark, PLLC

(57) ABSTRACT

A vibrator of the present invention comprises a coreless coil (2), a driver (4) including a magnet (4a) inserted in the coreless coil (2), a yoke (4b) for pinching the coreless coil (2) and facing the magnet (4a), and a top plate (4c), suspensions (6 and 8) for carrying resiliently the driver (4). The driver (4) is reciprocated in an axial direction of the coreless coil (2) by applying an alternate current to the coreless coil (2) to generate vibrations. The vibrator can be miniaturized without increasing a cost and has a good rising of vibrations.

9 Claims, 4 Drawing Sheets

U.S. PATENT DOCUMENTS

| | | | |
|---|---|---|---|
| 5,602,432 A * | 2/1997 | Mizutani | 310/15 |
| 6,265,796 B1 * | 7/2001 | Tezuka | 310/67 R |
| 6,268,671 B1 * | 7/2001 | Furuki | 310/81 |
| 6,359,371 B1 * | 3/2002 | Perkins et al. | 310/328 |
| 6,538,799 B2 * | 3/2003 | McClelland et al. | 359/291 |
| 6,873,067 B2 * | 3/2005 | Ichii et al. | 310/15 |
| 2003/0072441 A1 * | 4/2003 | Kobayashi et al. | 379/431 |
| 2005/0180592 A1 * | 8/2005 | Miura | 381/401 |

FOREIGN PATENT DOCUMENTS

| | | | |
|---|---|---|---|
| JP | 09267075 A * | 10/1997 | |
| JP | 10066194 A | 3/1998 | |
| JP | 2000023439 A | 7/1998 | |
| JP | 2002307013 A | 10/2002 | |
| JP | 2003009493 A | 1/2003 | |
| WO | WO 0194035 A1 * | 12/2001 | |

OTHER PUBLICATIONS

Matsushita Electric Ind. Co. Ltd., "Vibration Generating Motor", Patent Abstracts of Japan JP-07-107699, Apr. 21, 1995. Retrieved from the Internet: <URL: www19.ipdl.jpo.go.jp/PA1/result/detail/main/wAABsaWuhDA407107699P1.h . . . >.

* cited by examiner

VIBRATOR AND METHOD FOR MANUFACTURING THE SAME

FIELD OF THE INVENTION

The present invention relates to a vibrator used for a notification of arrival in a mobile phone or the like and a method for manufacturing the same.

DESCRIPTION OF THE PRIOR ART

Conventionally, many vibrators for a notification of arrival used in a mobile phone have been configured to generate vibrations by a motor rotating a weight (for example, see Japanese Patent Laid-Open Nos. H7-107699 and H 6-205565).

Generally, a light and compact vibrator is required to use in a mobile device such as the mobile phone. A competition in miniaturization of the motor has been carried out in the conventional vibrator. However, there is a problem that a commutator, a brush and so on are required for the motor and a special processing and any material are required to miniaturize the entire vibrator and therefore it costs much. Consequently, it is intended that the vibrator is miniaturized without increasing the cost.

Moreover, in the conventional vibrator in which the weight is rotated by the motor, sufficient vibrations cannot be obtained until the rotation of the motor is raised sufficiently. In this way, if it takes a long time for the raising of vibrations, in case of generating vibrations in response to a music for informing a user of arrival, there is generated a time lug without the vibrations being synchronized with the music.

SUMMARY OF THE INVENTION

The present invention has been made to resolve the aforementioned problems in the prior art and it is therefore an object of the present invention to provide a vibrator, which can be miniaturized without an increment of cost and has a good rising of vibrations and a method for manufacturing the same.

To attain the above object, the vibrator comprises: a coreless coil; a driver including a magnet inserted in the coreless coil, a yoke for sandwiching the coreless coil and opposing the magnet and a top plate; a suspension for carrying resiliently the driver.

An alternate current is supplied to the coreless coil to generate vibrations by reciprocation of the driver in an axial direction of the coreless coil.

In addition, a method for manufacturing a vibrator, according to the present invention comprises: a process for mounting coreless coils on a collective base plate capable of taking out a plurality of bases; a process for overlapping and mounting a first collective spacer plate on the collective base plate; a process for overlapping and mounting a first collective suspension plate on the first collective spacer plate; a process for overlapping and mounting a collective frame plate on the first collective suspension plate; a process for containing drivers in the collective frame plate and for supporting them by the first collective suspension plate; a process for overlapping and mounting a second collective suspension plate on the collective frame plate; a process for overlapping and mounting a second collective spacer plate on the second collective suspension plate; a process for overlapping and mounting a collective protector plate on the second collective suspension plate; and a process for cutting the collective base, first collective spacer, first collective suspension, collective frame, second collective suspension, second collective spacer and collective protector plates, which are overlapped and separating into an individual vibrator.

DETAILED DESCRIPTION OF THE PREFERRED EMBODIMENTS

An embodiment of the present invention will be explained with reference to the accompanying drawings below.

A vibrator according to the present invention comprises a coreless coil 2, a driver 4 and suspensions 6 and 8.

The coreless coil 2 is composed of a cylindrical bobbin 2a and a coil wound peripherally of the bobbin 2a and is disposed in a central portion of the vibrator.

Figure 3:
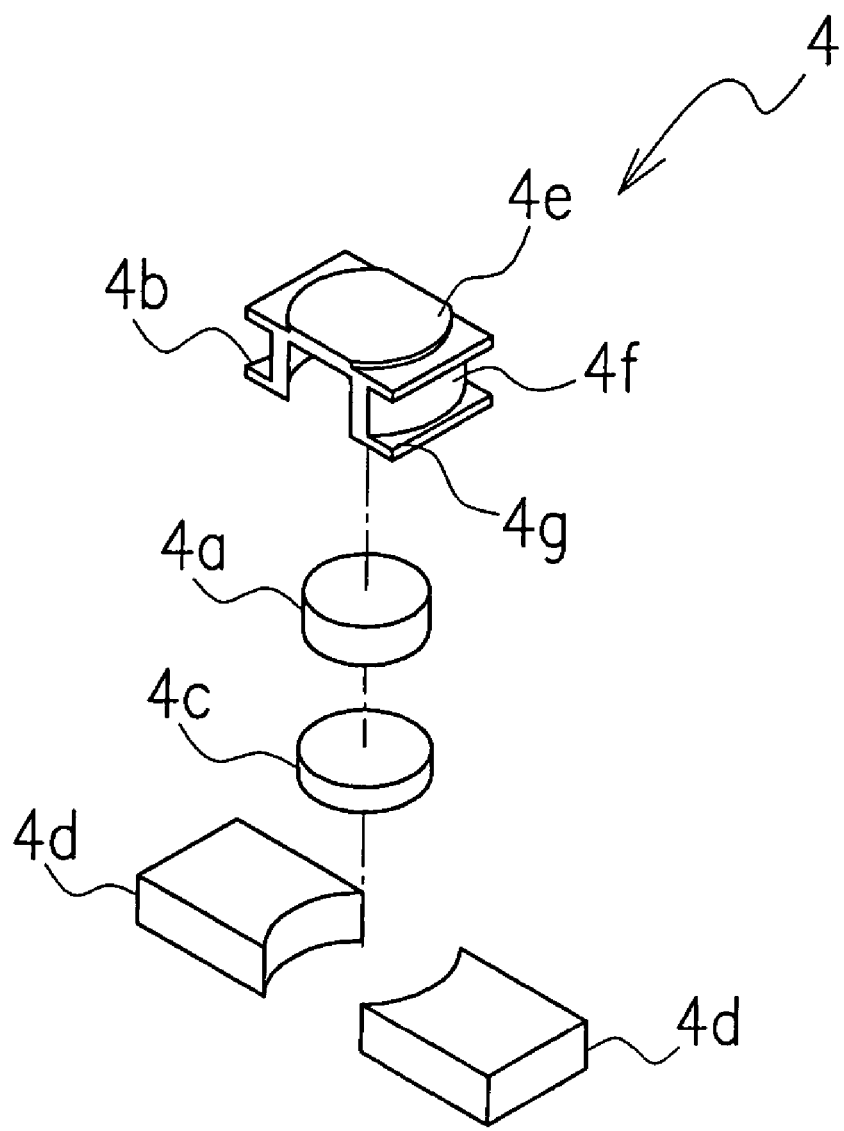
FIG. 3 is an exploded perspective view showing a structure of a driver in the vibrator.

The driver 4 in the embodiment is composed of a columnar magnet 4a, a yoke 4b attached on one end surface of the magnet 4a, a top plate 4c attached on the other end surface of the magnet 4a, and weights 4d attached to the yoke 4b, as shown in FIG. 3.

Figure 1:
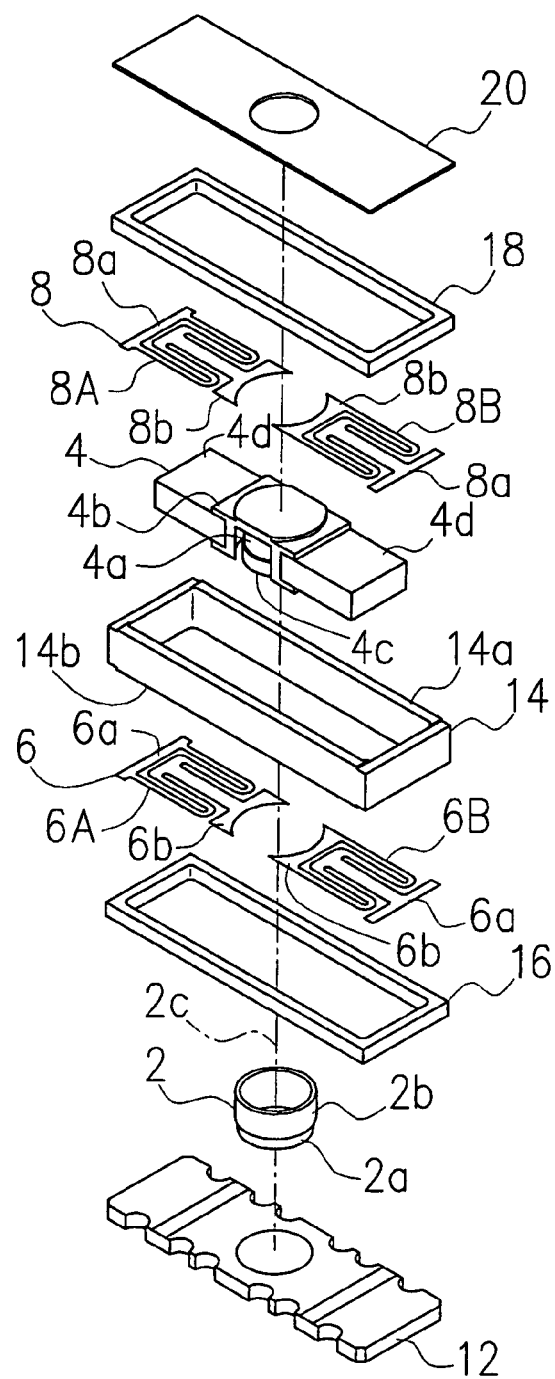
FIG. 1 is an exploded perspective view showing a structure of a vibrator according to the present invention.

The yoke 4b has a plate-like portion 4e attached on the one end surface of the magnet 4a, opposite side wall portions 4f projecting from the plate-like portion 4e and disposed with a predetermined distance from both side surfaces of the magnet 4a, and weight mounting portions 4g comprising protrusions provided on outer surfaces of the side wall portions 4f and configured to support the weights 4d from directions of reciprocating (upward and downward directions in FIGS. 1 and 3).

The driver 4 is disposed in such a manner that the magnet 4a is inserted in the coreless coil 2 and the side surfaces of the magnet 4a and the side wall portions 4f of the yoke 4b are disposed so as to face with respect to each other while sandwiching the coreless coil therebetween.

The suspensions 6 and 8 are composed of a pair of suspension members or plate springs 6A, 6B, 8A and 8B, respectively. The plate springs 6A, 6B, 8A and 8B each has at outer ends thereof opposite fixed ends 6a and 8a fixed to a case which will be explained and at inner ends thereof opposite opened ends 6b and 8b engaged with or mounted on the yoke 4b of the driver 4. The suspensions 6 and 8 are configured in such a manner that the plate springs 6A, 6B, 8A and 8B are disposed in axisymmetrical positions of a movement direction of the driver 4 or an axis 2c of the coreless coil 2, and support resiliently the driver 4.

Figure 2:
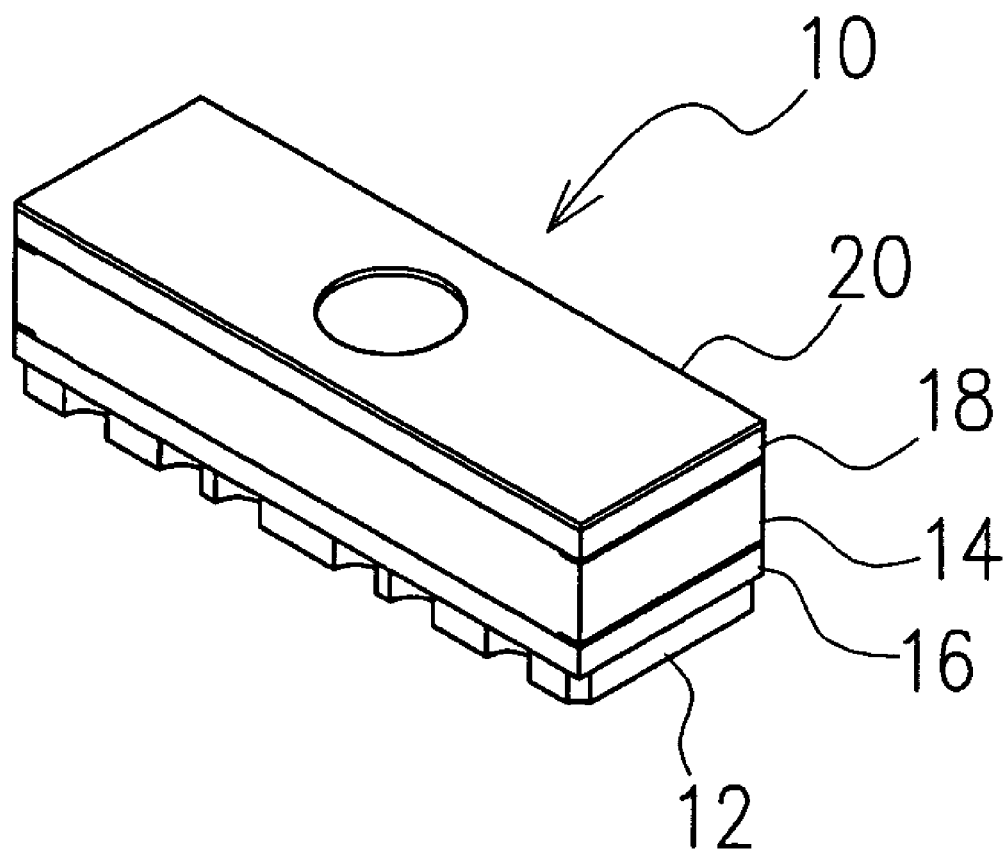
FIG. 2 is a perspective view showing the vibrator shown in FIG. 1 in an assembled state.

In the embodiment, the coreless coil 2, driver 4 and suspensions 6 and 8 are contained in the case 10 in order to unitize the vibrator and be easy to handle it. The case 10 is composed of a base 12, a frame 14, spacers 16 and 18, and a protector 20, as shown in FIG. 2.

As shown in FIG. 1, the coreless coil 2 is attached on a central portion of the base 12 in such a manner that the axis 2c of the coreless coil 2 becomes perpendicular to a surface of the base 12. The frame 14 is made of a synthetic resin and is adapted to contain therein the driver 4. The frame 14 has opposite openings 14a and 14b at forward and backward sides in a direction of movement (upward and downward directions in the drawing) of the driver 4, and fixed ends 8a and 6a of the suspensions 8 and 6 are fixed on edges of the openings 14a and 14b. In the embodiment, when the spacers 18 and 16 are attached on the edges of the openings 14a and 14b of the frame 14, respectively, the fixed ends 8a and 6a of the suspensions 8 and 6 are sandwiched and fixed between the frame 14 and spacers 18 and 16. The spacers 16 and 18 in the embodiment comprise ringlike bodies of a similar rectangular shape to the planar shape of the frame 14.

The lower opening 14b of the frame 14, in FIG. 1, is closed by means of the base 12 being mounted through the spacer 16 on the frame 14, and the upper opening 14a of the frame 14, in FIG. 1, is closed by means of the plate-like protector 20 being mounted through the spacer 18 on the frame 14.

In the vibrator having the above structure, the synchronous frequency of the driver 4 supported by the suspensions 6 and 8 is set to be 150 Hz and an alternate current is applied to the coreless coil 2.

In the vibrator, a magnetic flux is concentrated into gaps formed between the magnet 4a and the side wall portions 4f of the yoke 4b, and the driver 4 is reciprocated along the axis 2c by a magnetic field and a direction thereof generated by electrifying to the coreless coil 2 inserted between the side wall portions 4f. At this time, vibrations are generated in the vibrator to cause a mobile phone or the like, in which the vibrator is mounted, to vibrate.

In this way, because the vibrator structured as described generates the vibrations by reciprocating the driver 4 supported resiliently by means of the suspensions 6 and 8, by application of the alternate current to the coreless coil 2, the rising of the vibration is superior, differing from converting the rotation of the motor to the vibrations in the prior art.

In addition, in the embodiment, each of the components of the case 10 are formed into an approximately plate-like shape and the plate springs are used in the suspensions 6 and 8 in order to be easy to manufacture the vibrator by a method for manufacturing, which will be described hereinafter. The suspensions 6 and 8, base 12 and protector 20 may be also mounted on the frame 14 by omitting the spacers 16 and 18 and each of the suspensions 6 and 8 may be formed of a coil spring, a rubber and a resin having an elasticity, and so on.

Although the case 10 is also set in a planar rectangular shape extending in a direction crossing to the axis 2c in order to secure a stroke of the suspensions 6 and 8, otherwise it is possible to set a square, circle and so on so as to comply with the planar shape of the case and so on.

Figure 4:
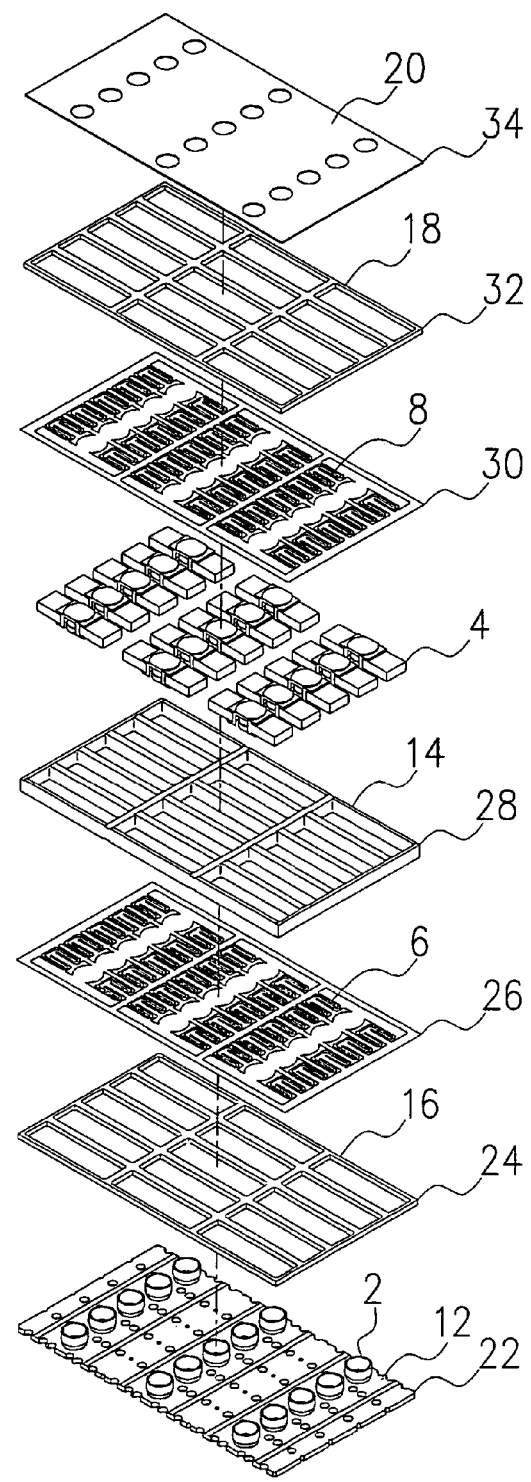
FIG. 4 is a perspective view showing a state of manufacturing the vibrator shown in FIG. 1.

The method for manufacturing the vibrator as shown in FIG. 1 will be explained in connection with FIG. 4. The manufacturing method is configured to be capable of manufacturing correctively a plurality of vibrators.

More specifically, there are used a collective base plate 22, a collective spacer plate or first collective spacer plate 24, a collective suspension plate or first collective suspension plate 26, a collective frame plate 28, a collective suspension plate or second collective suspension plate 30, a collective spacer plate or second collective spacer plate 32 and a collective protector plate 34, which are capable of taking out a plurality of bases 12, spacers 16, suspensions 6, frames 14, suspensions 8, spacers 18 and protectors 20, respectively, as sown in FIG. 1.

Each of the coreless coils 2 is, first, mounted on the corresponding portion to each of the bases 12 in the collective base plate 22. In addition, the collective base plate 22 is pre-formed with through-holes, a conductive pattern and so on, as needed, and coil terminals of each of the coreless coils 2 are connected with the conductive pattern by soldering or the like.

The collective spacer plate 24, first collective suspension plate 26 and collective frame plate 28 are overlapped in turn on the collective base plate 22. These plates are adhered through adhesive layers formed on both or one of mutual contacting surfaces by printing or the like, or adhesive sheets disposed therebetween. When the plates are overlapped, the corresponding portions of the spacer 16, suspension 6 and frame 14 in each vibrator are overlapped to match, respectively.

Here, each of the drivers 4 is contained in each of the frames 14 in the collective frame plate 28 and each driver 4 is supported on each of the suspensions 6 in the first collective suspension plate 26. In addition, thereafter, by the second collective suspension plate 30 being mounted, the driver 4 is sandwiched by and supported on the suspensions 6 and 8 in the first and second collective suspension plates 26 and 30.

Thereafter, the second collective suspension, collective spacer and collective protector plates 30, 32 and 34 are overlapped in turn on the collective frame plate 28. At this time, similarly, these plates are adhered through adhering layers formed on both or one of mutual contacting surfaces by printing or the like, or adhering sheets disposed therebetween. Also, the corresponding portions of the suspension 8, spacer 18 and protector 20 in each vibrator are overlapped to match, respectively.

As described above, after the collective plates are overlapped in turn and adhered, the plates are cut a dicer and separated into individual vibrators.

Thereby, a great number of vibrators can be manufactured at a time.

According to the present invention, a good rising of vibrations can be expected, because the vibrations are generated by reciprocation of the driver without converting the rotation of the motor or the like to the vibrations.

Therefore, it is possible to generate or stop the vibrations in response to a melody and so on, informing a user of arrival in a mobile phone or the like.

The present invention makes also it possible to provide a simple structure, a compact and thinned vibrator, because the plate-like suspensions, the driver having a simple structure and the coreless coil are contained in the case comprising a combination of the plate-like base, protector and frame, and therefore they are unitized.

Moreover, the present invention makes it possible to carry out a mass-production of the vibrator, a superior workability due to simple processes in the manufacture of vibrator and to promote the reduction of cost, because the many parts of the vibrator are configured to be capable of taking out and then the collected parts can be manufactured by overlapping them in turn.

What is claimed is:

1. A vibrator comprising:
   a coreless coil having an axis and disposed in a central portion of the vibrator:
   a driver including a magnet to be inserted in the coreless coil, a yoke, a pair of weights attached to both sides of said yoke, and a top plate attached to the magnet; and
   at least one suspension supporting the driver resiliently,
   wherein the at least one suspension comprises a pair of plate springs disposed in axisymmetrical positions to support from both sides of the driver, wherein the pair of plates springs disposed at the both sides of the driver are arranged on a line extending in a substantially perpendicular direction to the axis, wherein an outer end of each plate spring is fixed and an inner end of each plate spring which is opened supports the driver, wherein the opened inner ends of the pair of plate springs support the driver from both sides.

2. The vibrator according to claim 1, wherein an alternate current is applied to said coreless coil to generate vibrations by reciprocation of said driver in the axial direction.

3. The vibrator according to claim 1, wherein said at least one suspension comprises two suspensions each of which includes a pair of plate springs disposed to support from the both sides of the driver;

wherein the pair of plate springs of the two suspensions are configured to sandwich the driver at above and below portions of the driver in the axial direction.

4. The vibrator according to claim 1, further comprising a case wherein the coreless coil, the driver and the at least one suspension are contained in the case.

5. The vibrator according to claim 4, wherein the case includes a frame having an opening for surrounding the driver, a base for fixing the coreless coil and closing one side of the opening of the frame, and a protector for closing the other side of the opening of the frame.

6. The vibrator according to claim 5, wherein the case has a spacer, the at least one suspension being fixed between the spacer and the frame.

7. A vibrator having an elongated shape comprising:

a coreless coil having an axis and being centrally located in the elongated vibrator;

a driver including a magnet to be inserted in the coreless coil, a yoke, a pair of weights attached to both sides of said yoke, and a top plate attached to the magnet;

at least one suspension supporting the driver resiliently, wherein the at least one suspension comprises a first pair of plate springs disposed in axisymmetrical positions substantially perpendicular to the axis and supporting from opposite sides of said driver and extending along the elongated shape of the vibrator, an outer end of each spring distance from the vibrator being anchored and an inner end of each plate spring proximal to the vibrator being opened and supporting the driver, and opposite portions of the driver being supported by the inner ends of said plate springs.

8. The vibrator according to claim 7, wherein an alternate current is applied to said coreless coil to generate vibrations by reciprocation of said driver in the axial direction.

9. The vibrator according to claim 7, further comprising a second suspension for supporting the driver resiliently and disposed in axisymmetrical portions parallel to the first pair of plate springs.

* * * * *